(12) United States Patent
Lee

(10) Patent No.: US 7,667,957 B2
(45) Date of Patent: Feb. 23, 2010

(54) THIN-TYPE DISPLAY

(75) Inventor: Kun-Sheng Lee, Taipei (TW)

(73) Assignee: Cherng Jyieh Corp., Taipei (TW)

( * ) Notice: Subject to any disclaimer, the term of this patent is extended or adjusted under 35 U.S.C. 154(b) by 313 days.

(21) Appl. No.: 11/545,775

(22) Filed: Oct. 11, 2006

(65) Prior Publication Data

US 2008/0117574 A1 May 22, 2008

(51) Int. Cl.
*H05K 7/12* (2006.01)
(52) U.S. Cl. .................. 361/679.22; 248/917
(58) Field of Classification Search ........... 361/681, 361/679.22; 248/917; 455/575.4
See application file for complete search history.

(56) References Cited

U.S. PATENT DOCUMENTS

| | | | |
|---|---|---|---|
| 6,229,584 B1 * | 5/2001 | Chuo et al. .......... | 349/58 |
| 7,014,154 B2 * | 3/2006 | Jeong et al. .......... | 248/157 |
| 7,424,991 B2 * | 9/2008 | Kim et al. ............ | 248/125.9 |
| 2006/0219849 A1 * | 10/2006 | Chiu ................... | 248/125.8 |

* cited by examiner

*Primary Examiner*—Jayprakash N Gandhi
*Assistant Examiner*—Ingrid Wright
(74) *Attorney, Agent, or Firm*—Bacon & Thomas, PLLC

(57) ABSTRACT

A thin-type display including: a panel main body having a panel, a frame for accommodating the panel and a transmission interface for receiving signals; a movable bracket having a connecting section fixedly connectable to the back of the panel main body and a fixing section pivotally connected with the connecting section; and a support arm composed of a jacket, a slide member, a leaf spring assembly and a sleeve. The movable bracket is disposed at an upper end of the support arm. A lower end of the support arm is connected with a base. The back face of the frame of the panel main body is formed with a downward extending recessed section. The connecting section of the movable bracket is connected with the panel main body at lower end of the recessed section distal from the transmission interface arranged on the top face of the recessed section.

21 Claims, 6 Drawing Sheets

THIN-TYPE DISPLAY

BACKGROUND OF THE INVENTION

The present invention is related to an improved thin-type display in which the posit-ion relationship between the support arm and the panel main body is such changed as to facilitate the installation of the transmission interface. The transmission interface and the support arm will not interfere with each other. In addition, the height of the panel main body is adjustable to shade the support arm and the exposed transmission lines.

FIG. 1 shows a conventional thin-type display including a panel 10, a connecting section 20, a support arm 30 and a base 40 for supporting the panel 10. The connecting section 20 is arranged at the center of the back face of the panel 10 and pivotally connected with the head end of the support arm 30. The support arm 30 substantially upright stands on the base 40.

In the conventional thin-type display, the transmission interface 50 is arranged in a receptacle at the center of the back face of the panel 10. Multiple transmission lines 60 are connected to the transmission interface 50. The support arm 30 shades the transmission interface 50 and forms an obstacle to the installation of the transmission lines 60.

FIG. 2 shows another type of conventional display for overcoming the above problem. The connecting section 20 is arranged at the bottom of the back face of the panel 10 and pivotally connected with the support arm 30. Accordingly, the connecting section 20 and the support arm 30 will not shade the transmission interface 50 and form an obstacle to the installation of the transmission lines 60. However, when adjusting the elevation of the panel 10, the exposed parts of the transmission lines 60 cannot be shaded by the support arm 30. This leads to a poor appearance.

SUMMARY OF THE INVENTION

It is therefore a primary object of the present invention to provide an improved thin-type display in which the position relationship between the support arm and the panel main body is such changed as to facilitate the installation of the transmission interface.

According to the above object, the thin-type display of the present invention includes: a panel main body having a panel, a frame for accommodating the panel and a transmission interface for receiving signals; a movable bracket having a connecting section fixedly connectable to the back of the panel main body and a fixing section pivotally connected with the connecting section for adjusting the angle of elevation/depression of the panel main body; and a support arm composed of a jacket, a slide member, a leaf spring assembly and a sleeve. The movable bracket is disposed at an upper end of the support arm. A lower end of the support arm is connected with a base. The back face of the frame of the panel main body is formed with a downward extending recessed section. The connecting section of the movable bracket is connected with the panel main body at lower end of the recessed section distal from the transmission interface arranged on the top face of the recessed section. This facilitates the operation and installation and achieves a tidy appearance.

The present invention can be best understood through the following description and accompanying drawings wherein:

DETAILED DESCRIPTION OF THE PREFERRED EMBODIMENTS

Figure 1:
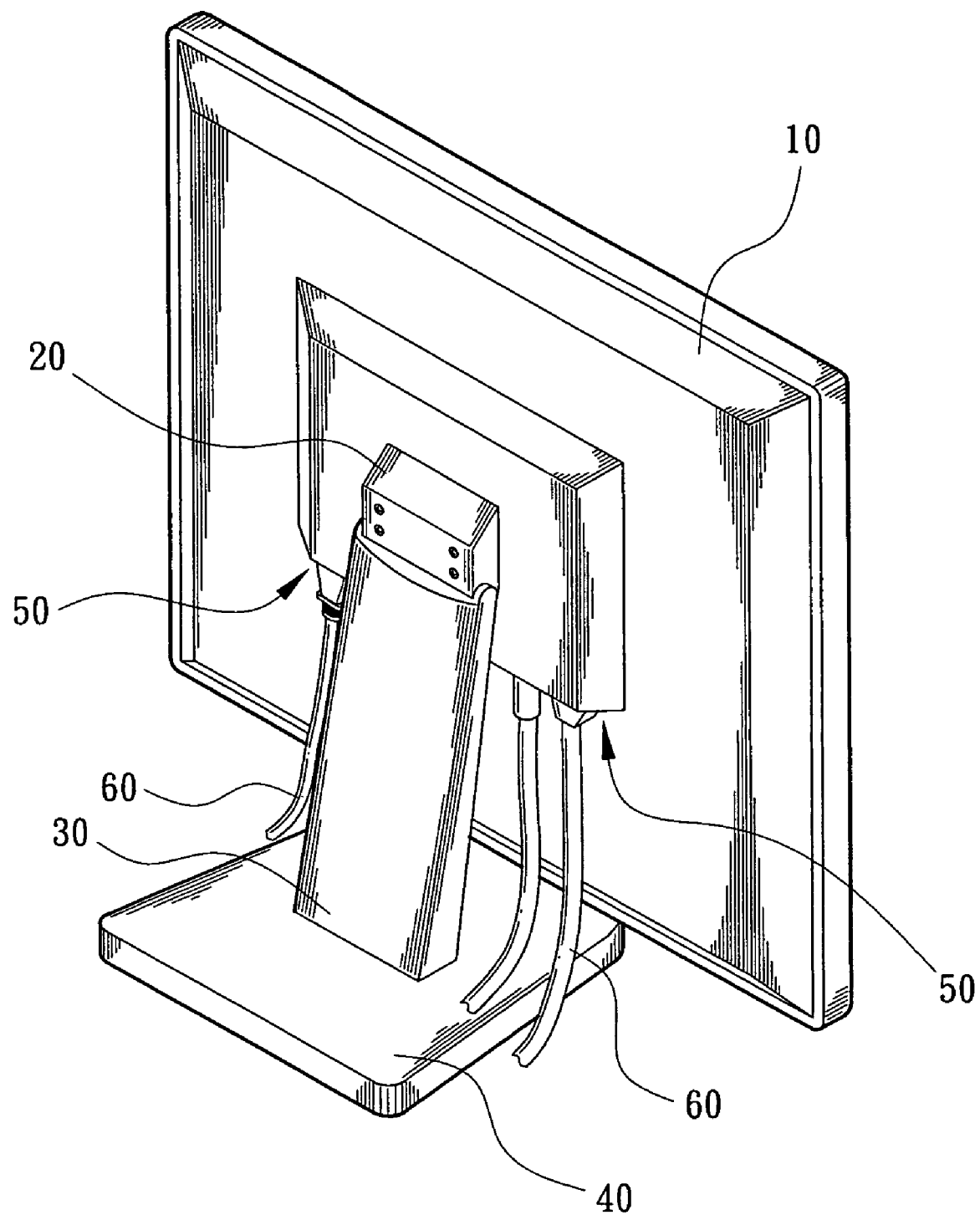
FIG. 1 is a perspective view of a conventional thin-type display.
Figure 2:
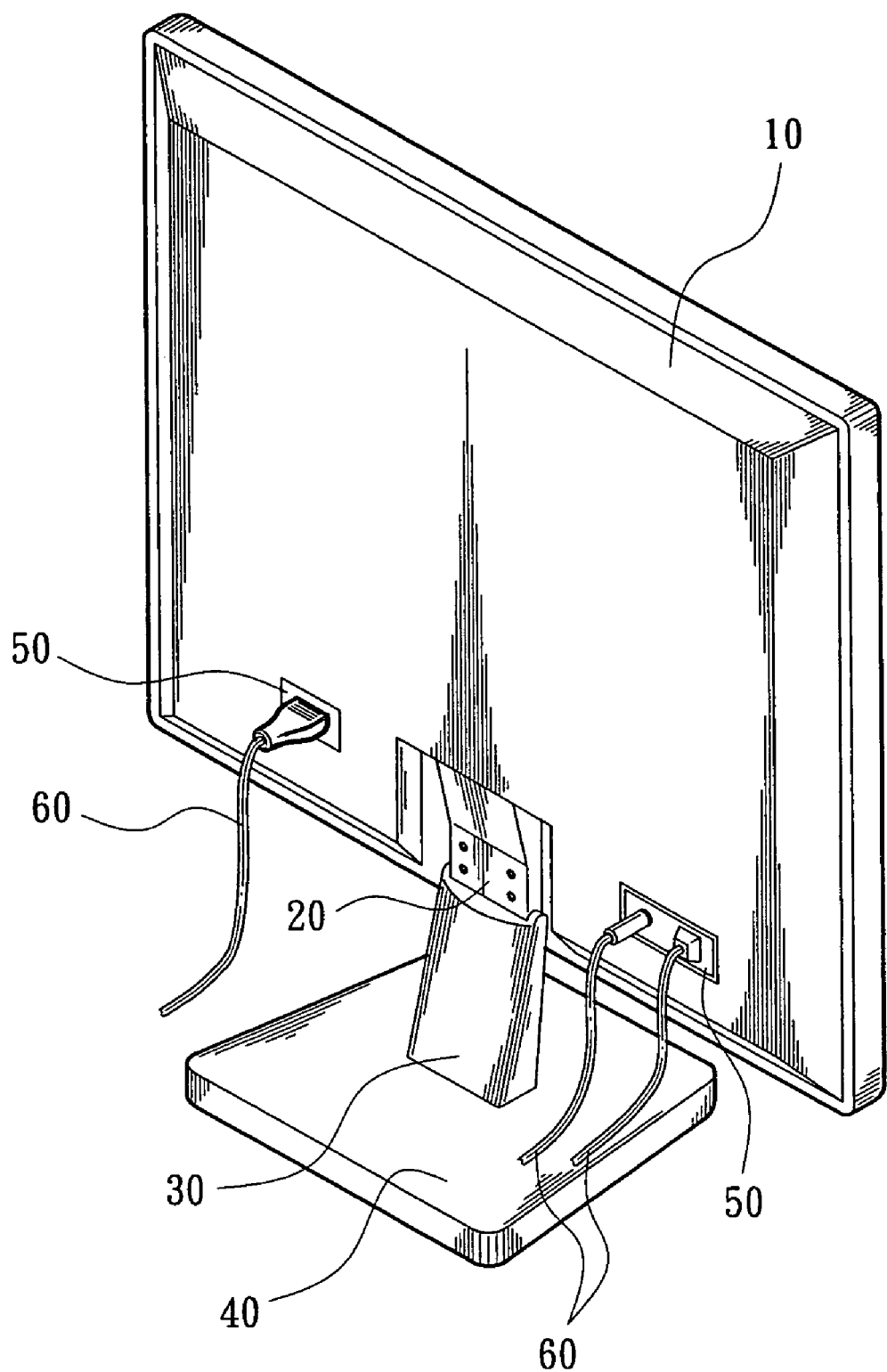
FIG. 2 is a perspective view of another conventional thin-type display.
Figure 3:
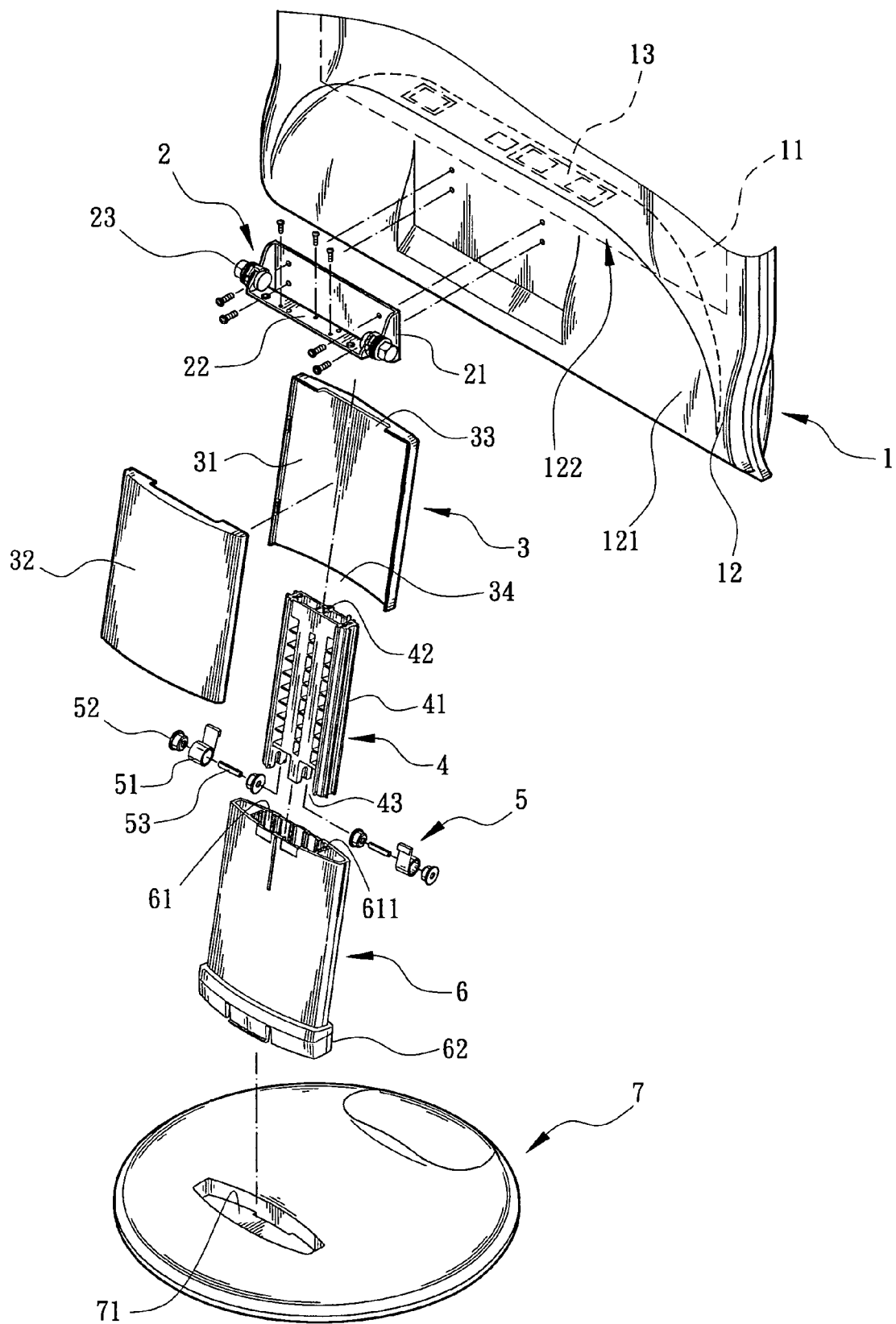
FIG. 3 is a perspective exploded view of a preferred embodiment of the present invention.
Figure 4:
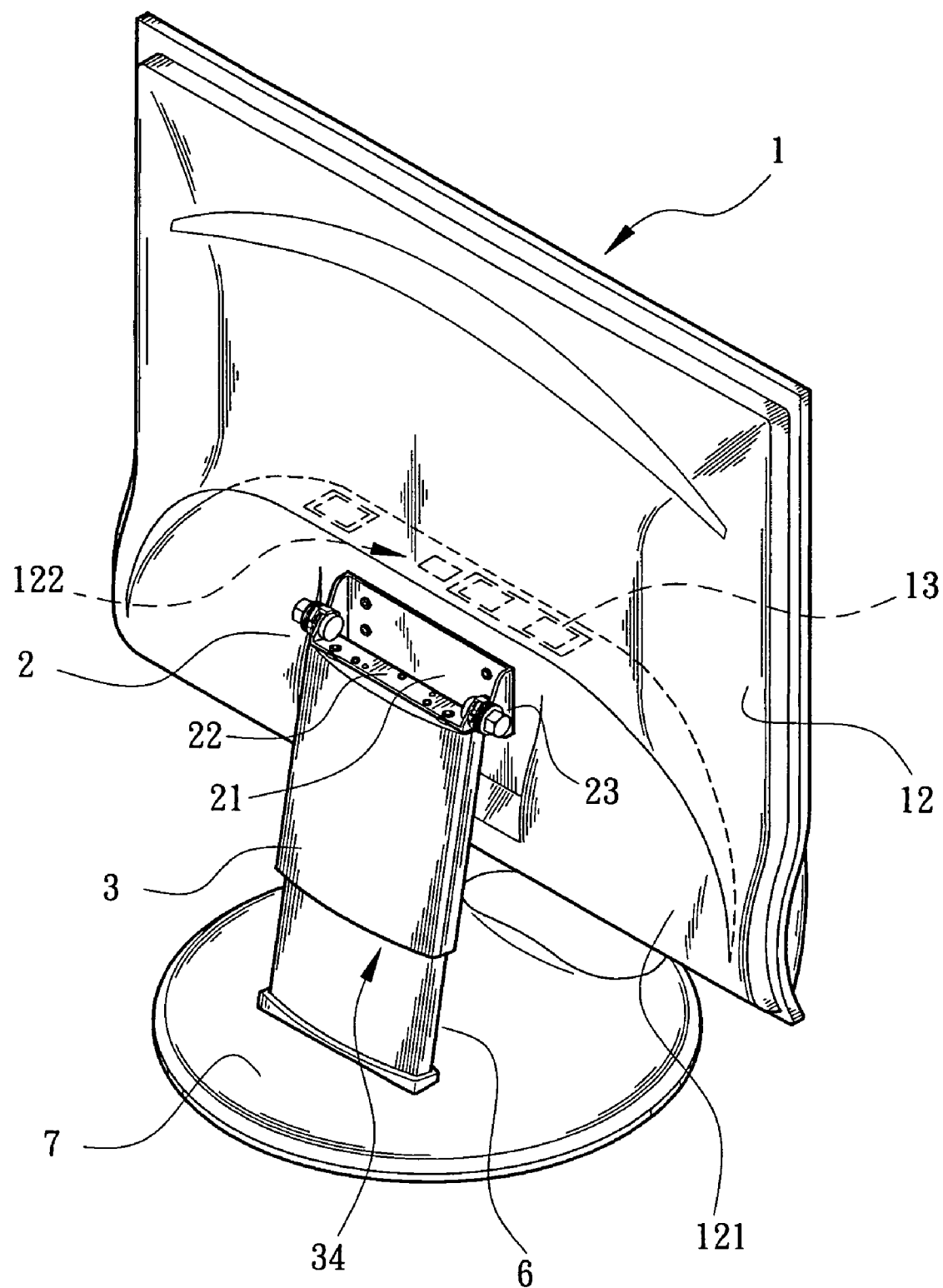
FIG. 4 is a perspective assembled view of the preferred embodiment of the present invention.

Please refer to FIGS. 3 and 4. The thin-type display of the present invention includes a panel main body 1 having a panel 11, a frame 12 for accommodating the panel 11 and a transmission interface 13 for receiving signals. The thin-type display of the present invention further includes a movable bracket 2 having a connecting section 21 fixedly connectable to the back of the panel main body 1 and a fixing section 22 pivotally connected with the connecting section 21 via at least one pivot member 23. Accordingly, the connecting section 21 and the fixing section 22 together form an elbow structure for adjusting angle of elevation/depression of the panel main body 1.

The thin-type display of the present invention further includes a support arm composed of a jacket 3, a slide member 4, a leaf spring assembly 5 and a sleeve 6. In this embodiment, at least one longitudinal guide rib 41 is formed on each of left and right sides of the slide member 4. The slide member 4 is received in a cavity 61 defined by the sleeve 6. Each of the left and right sidewalls of the cavity 61 is formed with at least one longitudinal guide channel 611 in which the guide rib 41 is inlaid, whereby the slide member 4 is up and down movable along the guide channels 611. In this embodiment, the leaf spring assembly 5 includes a leaf spring 51, two bearings 52 and a shaft 53. One end of the leaf spring 51 is hooked on an upper end of the sleeve 6, while the other end of the leaf spring 51 are fixedly fitted with the two bearings 52. The shaft 53 is fitted through the bearings 52 and the other end of the leaf spring 51 to serially pivotally connect the same. The bottom end of the slide member 4 is formed with notches 43 facing downward. Two ends of the shaft 53 are inserted in the notches 43. When the slide member 4 is pressed downward, the leaf spring 51 provides a restoring force in reverse direction to offset the downward action force of the slide member 4. Therefore, the support arm can keep at a set height.

In this embodiment, the movable bracket 2 is connected with a retaining section 42 of the slide member 4. The jacket 3 is composed of a first and a second casings 31, 32 which are associated to together define a slot 33 slightly smaller than a top wall-of the slide member 4. Through the slot 33, the fixing section 22 of the movable bracket 2 is fixed with the retaining section 42 by means of screws or rivets to clamp the top wall of the jacket 3. Accordingly, the movable bracket 2 is fixed with the slide member 4 with the slide member 4 received in a space defined by the first and second casings 31, 32 of the jacket 3. In addition, a lower end of the slide member 4 extends through a lower opening 34 of the jacket 3 to connect with the upper end of the sleeve 6 via the leaf spring assembly 5. The lower end of the sleeve 6 has a locating section 62 inlaid in an insertion slot 71 of the base 7. Accordingly, the panel main body 1 can substantially stand upright with the elevation and height adjustable. In a preferred embodiment, the connecting section 21 can be directly disposed at the top end of the support arm to fixedly connect with the panel main body 1.

Referring to FIG. 4, the back face of the frame 12 of the panel main body 1 is formed with a downward extending recessed section 121. The connecting section 21 of the movable bracket 2 is connected with the panel main body 1 at lower end of the recessed section 121 distal from the transmission interface 13 arranged on the top face 122 of the recessed section 121. This facilitates the operation and installation.

Figure 5:
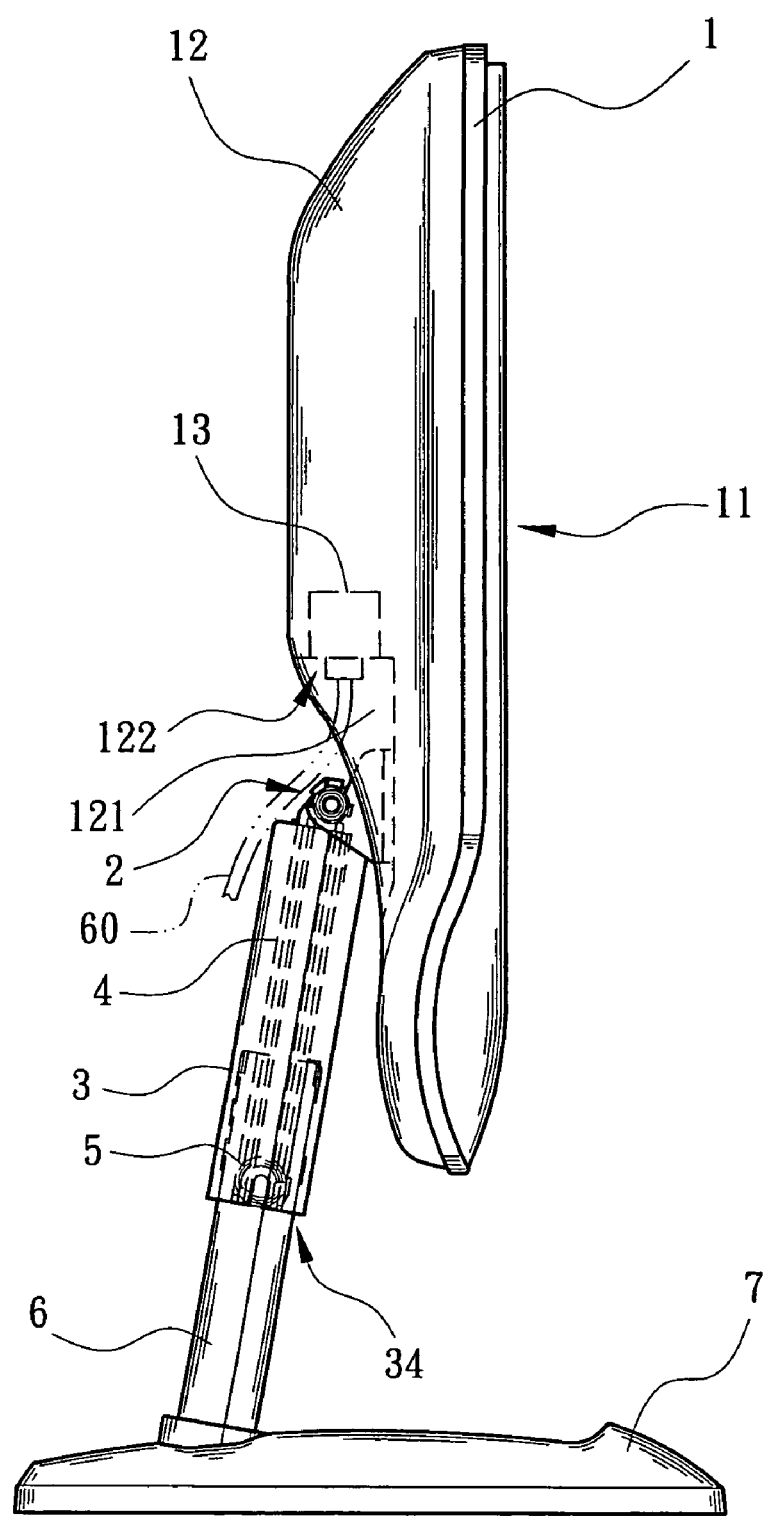
FIG. 5 is a perspective exploded view of the preferred embodiment of the present invention, showing that the panel main body is positioned at a highest position.

FIG. 5 shows an initial state of the support arm. With the leaf spring assembly 5 wound, the slide member 4 and the jacket 3 are positioned at a highest height. In this embodiment, the leaf spring 51 is adopted in such consideration of the weight of the panel main body 1 and the frictional force between the guide ribs 41 and the guide channels 611 that when the panel main body 1 is released from the external application force, the slide member 4 can readily stop within the sleeve 6 to locate the panel main body 1 in a desired position.

Figure 6:
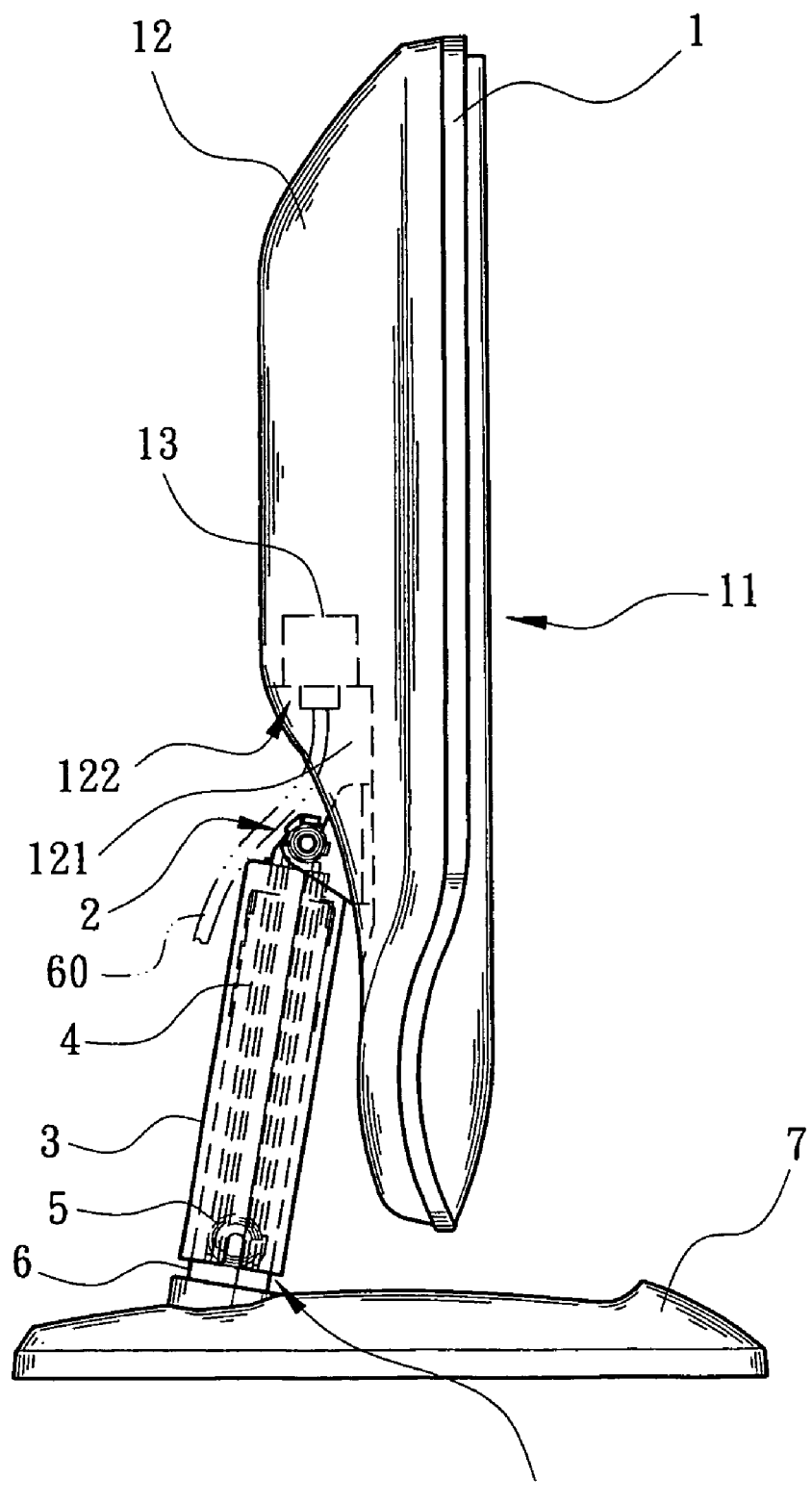
FIG. 6 is a perspective exploded view of the preferred embodiment of the present invention, showing that the panel main body is pressed down.

Referring to FIG. 6, when the slide member 4 is pressed downward, the leaf spring 61 provides a reaction force in reverse direction to offset the downward action force of the slide member 4. Therefore, the support arm can keep at a set height. In actual use, a user can press down the panel main body 1 and reduce the height thereof so as to shade the support arm and the exposed transmission lines 60. This can achieve a tidy appearance.

In conclusion, the position relationship between the movable bracket 2, the support arm and the panel main body 1 facilitates the installation of the transmission interface 13. The transmission interface 13 and the support arm will not interfere with each other. In addition, by means of the support arm, the height of the panel main body 1 is adjustable to shade the support arm and the exposed transmission lines 60.

The above embodiments are only used to illustrate the present invention, not intended to limit the scope thereof. Many modifications of the above embodiments can be made without departing from the spirit of the present invention.

What is claimed is:

1. A thin-type display comprising a panel main body and a support arm, the panel main body having a panel and a frame for accommodating the panel, a back face of the frame of the panel main body being formed with a downward extending recessed section, a connecting section being disposed at a top end of the support arm, the connecting section being fixedly connected in the downward recessed section of the back face of the frame of the panel main body, whereby the support arm is at least partially shaded by the downward recessed section of the frame of the panel main body;

wherein the support arm is composed of a jacket, a slide member, a leaf spring assembly and a sleeve, at least one longitudinal guide rib being formed on each of left and right sides of the slide member, the slide member being received in a cavity defined by the sleeve, each of the left and right sidewalls of the cavity being formed with at least one longitudinal guide channel in which the guide rib is inlaid, whereby the slide member is up and down movable along the longitudinal guide channels; and wherein the leaf spring assembly includes a leaf spring, two bearings and a shaft, one end of the leaf spring being hooked on an upper end of the sleeve, while the other end of the leaf spring being fixedly fitted with the two bearings, the shaft being fitted through the bearings and the other end of the leaf spring to serially pivotally connect the same, a bottom end of the slide member being formed with notches facing downward, two ends of the shaft being inserted in the notches.

2. The thin-type display as claimed in claim 1, wherein a movable bracket is disposed at the top end of the support arm, the movable bracket including a fixing section, at least one pivot member and a connecting section fixedly connectable to the back face of the panel main body, the connecting section and the fixing section being connected with each other via the pivot member, whereby the connecting section and the fixing section together form an elbow structure.

3. The thin-type display as claimed in claim 2, wherein the panel main body further includes a transmission interface disposed in the recessed section.

4. The thin-type display as claimed in claim 3, wherein the transmission interface is arranged on a top face of the recessed section.

5. The thin-type display as claimed in claim 3, wherein a lower end of the support arm is connected with a base.

6. The thin-type display as claimed in claim 5, wherein a lower end of the sleeve has a locating section inlaid in an insertion slot of the base.

7. The thin-type display as claimed in claim 2, wherein a lower end of the support arm is connected with a base.

8. The thin-type display as claimed in claim 7, wherein a lower end of the sleeve has a locating section inlaid in an insertion slot of the base.

9. The thin-type display as claimed in claim 1, wherein the panel main body further includes a transmission interface disposed in the recessed section.

10. The thin-type display as claimed in claim 9, wherein the transmission interface is arranged on a top face of the recessed section.

11. The thin-type display as claimed in claim 9, wherein a lower end of the support arm is connected with a base.

12. The thin-type display as claimed in claim 11, wherein a lower end of the sleeve has a locating section inlaid in an insertion slot of the base.

13. The thin-type display as claimed in claim 1, wherein the jacket is composed of a first and a second casings which are associated to together define a top slot and a lower opening.

14. The thin-type display as claimed in claim 13, wherein the top slot of the jacket is slightly smaller than a top face of the slide member, the connecting section being connected with a retaining section of the slide member, through the top slot, the connecting section being fixed with the retaining section by means of screws or rivets to clamp a top wall of the jacket, whereby the movable bracket is fixed with the slide member with the slide member received in a space defined by the first and second casings.

15. The thin-type display as claimed in claim 14, wherein a lower end of the slide member extends through the lower opening of the jacket to connect with the upper end of the sleeve via the leaf spring assembly.

16. The thin-type display as claimed in claim 1, wherein a lower end of the support arm is connected with a base.

17. The thin-type display as claimed in claim 16, wherein a lower end of the sleeve has a locating section inlaid in an insertion slot of the base.

18. A thin-type display comprising a panel main body and a support arm, the panel main body having a panel and a frame for accommodating the panel, a back face of the frame of the panel main body being formed with a downward extending recessed section, a connecting section being disposed at a top end of the support arm, the connecting section being fixedly connected in the recessed section of the back face of the frame of the panel main body, whereby the support arm is at least partially shaded by the recessed section of the frame of the panel main body;

wherein a movable bracket is disposed at the top end of the support arm, the movable bracket including a fixing section, at least one pivot member and a connecting section fixedly connectable to the back face of the panel main body, the connecting section and the fixing section being connected with each other via the pivot member, whereby the connecting section and the fixing section together form an elbow structure;

wherein the support arm is composed of a jacket, a slide member, a leaf spring assembly and a sleeve, at least one longitudinal guide rib being formed on each of left and right sides of the slide member, the slide member being received in a cavity defined by the sleeve, each of the left and right sidewalls of the cavity being formed with at least one longitudinal guide channel in which the longitudinal guide rib is inlaid, whereby the slide member is up and down movable along the guide longitudinal channels; and wherein the leaf spring assembly includes a leaf spring, two bearings and a shaft, one end of the leaf spring being hooked on an upper end of the sleeve, while the other end of the leaf spring being fixedly fitted with the two bearings, the shaft being fitted though the bearings and the other end of the leaf spring to serially pivotally connect the same, a bottom end of the slide member being formed with notches facing downward, two ends of the shaft being inserted in the notches.

19. The thin-type display as claimed in claim 18, wherein the jacket is composed of a first and a second casings which are associated to together define a top slot and a lower opening.

20. The thin-type display as claimed in claim 18, wherein the top slot of the jacket is slightly smaller than a top face of the slide member, the movable bracket being connected with a retaining section of the slide member, through the top slot, the fixing section of the movable bracket being fixed with the retaining section by means of screws or rivets to clamp a top wall of the jacket, whereby the movable bracket is fixed with the slide member with the slide member received in a space defined by the first and second casings.

21. The thin-type display as claimed in claim 20, wherein a lower end of the slide member extends through the lower opening of the jacket to connect with the upper end of the sleeve via the leaf spring assembly.

* * * * *

UNITED STATES PATENT AND TRADEMARK OFFICE
CERTIFICATE OF CORRECTION

PATENT NO. : 7,667,957 B2  Page 1 of 1
APPLICATION NO. : 11/545775
DATED : February 23, 2010
INVENTOR(S) : Kun-Sheng Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Fourth Day of January, 2011

David J. Kappos
*Director of the United States Patent and Trademark Office*